United States Patent
Ford et al.

(10) Patent No.: US 7,983,162 B1
(45) Date of Patent: Jul. 19, 2011

(54) AGGREGATE MAXIMUM THROUGHPUT FOR GROUPS OF SERVICE FLOWS

(75) Inventors: Alan R. Ford, Hornsby (AU); John T. Chapman, Saratoga, CA (US); Alon S. Bernstein, Sunnyvale, CA (US)

(73) Assignee: Cisco, Technology, Inc., San Jose, CA (US)

( * ) Notice: Subject to any disclaimer, the term of this patent is extended or adjusted under 35 U.S.C. 154(b) by 962 days.

(21) Appl. No.: 11/329,920

(22) Filed: Jan. 10, 2006

(51) Int. Cl.
*H04L 12/26* (2006.01)
(52) U.S. Cl. ...................................................... 370/232
(58) Field of Classification Search .................. 370/229, 370/235, 236, 230, 232, 234; 725/105, 107, 725/109–111, 114–121, 131–134, 143–149, 725/151–152
See application file for complete search history.

(56) References Cited

U.S. PATENT DOCUMENTS

| | | | |
|---|---|---|---|
| 6,223,222 B1 * | 4/2001 | Fijolek et al. ................. | 709/227 |
| 2002/0062486 A1 * | 5/2002 | Park .............................. | 725/111 |
| 2003/0065809 A1 * | 4/2003 | Byron ........................... | 709/232 |
| 2003/0081626 A1 * | 5/2003 | Naor et al. ..................... | 370/431 |
| 2003/0202467 A1 * | 10/2003 | Bruckman et al. ............ | 370/229 |
| 2004/0060069 A1 * | 3/2004 | Abramson ..................... | 725/110 |
| 2004/0066746 A1 * | 4/2004 | Matsunaga ................... | 370/235 |
| 2006/0146868 A1 * | 7/2006 | Ginzburg ...................... | 370/465 |
| 2006/0215558 A1 * | 9/2006 | Chow ............................ | 370/232 |
| 2008/0037429 A1 * | 2/2008 | Lansing et al. ............... | 370/235 |

* cited by examiner

*Primary Examiner* — Derrick Ferris
*Assistant Examiner* — Omar Ghowrwal
(74) *Attorney, Agent, or Firm* — Marger Johnson & McCollom, P.C.

(57) ABSTRACT

A network device has a port to allow the device to communicate with user devices. The network device also has a processor to assign any user devices in communication with the device to a group. The processor also monitors traffic of the user devices so as to control a traffic rate of the group.

18 Claims, 3 Drawing Sheets

AGGREGATE MAXIMUM THROUGHPUT FOR GROUPS OF SERVICE FLOWS

BACKGROUND

Networks, such as cable networks, may become overloaded with too many users and too much traffic. Network providers can regulate how much bandwidth a given user may have, either by direct regulation of the user, or by regulation of a group to which the user belongs.

In cable networks, for example, there may be many cable modems attached to their network access device, usually referred to as a cable modem termination server (CMTS). There may be several cable modems that use a particular CMTS for connection to the cable network, and eventually larger data networks. When a cable modem connects to the CMTS, they generally receive two service flow allocations for traffic rates, one for the upstream, from the cable modem to the CMTS and one for the downstream, from the CMTS to the cable modem.

In many instances, however, it may be desirable to regulate the traffic rates for groups of cable modems connected to a particular CMTS. For example, one business user may have several cable modems on a CMTS and the network provider may want to limit the traffic rate available to the user's cable modems so other users do not suffer service problems. In another example, cable modem subscribers may have the option of paying more for 'premium' network service rather than 'basic' service, and those users that are 'basic' users on the CMTS may have their traffic rates limited in favor of the premium customers. Currently, regulation of traffic rates is generally done on a per-CMTS or service flow basis.

SUMMARY

One embodiment is a network device has a port to allow the device to communicate with user devices. The network device also has a processor to assign any user devices in communication with the device to a group. The processor also monitors traffic of the user devices so as to control a traffic rate of the group.

Another embodiment is a method of managing traffic. The method includes receiving a request from a user device, identifying a group to which the user device belongs, determining if granting the request will exceed a group traffic rate, and resolving the request.

In another embodiment, a user device may be assigned to a group by defining a parameter in a configuration file for the modem, receiving a connection request from the modem, receiving the configuration file from the modem, where the configuration file contains the parameter, and using the parameter to assign the cable modem to a group.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
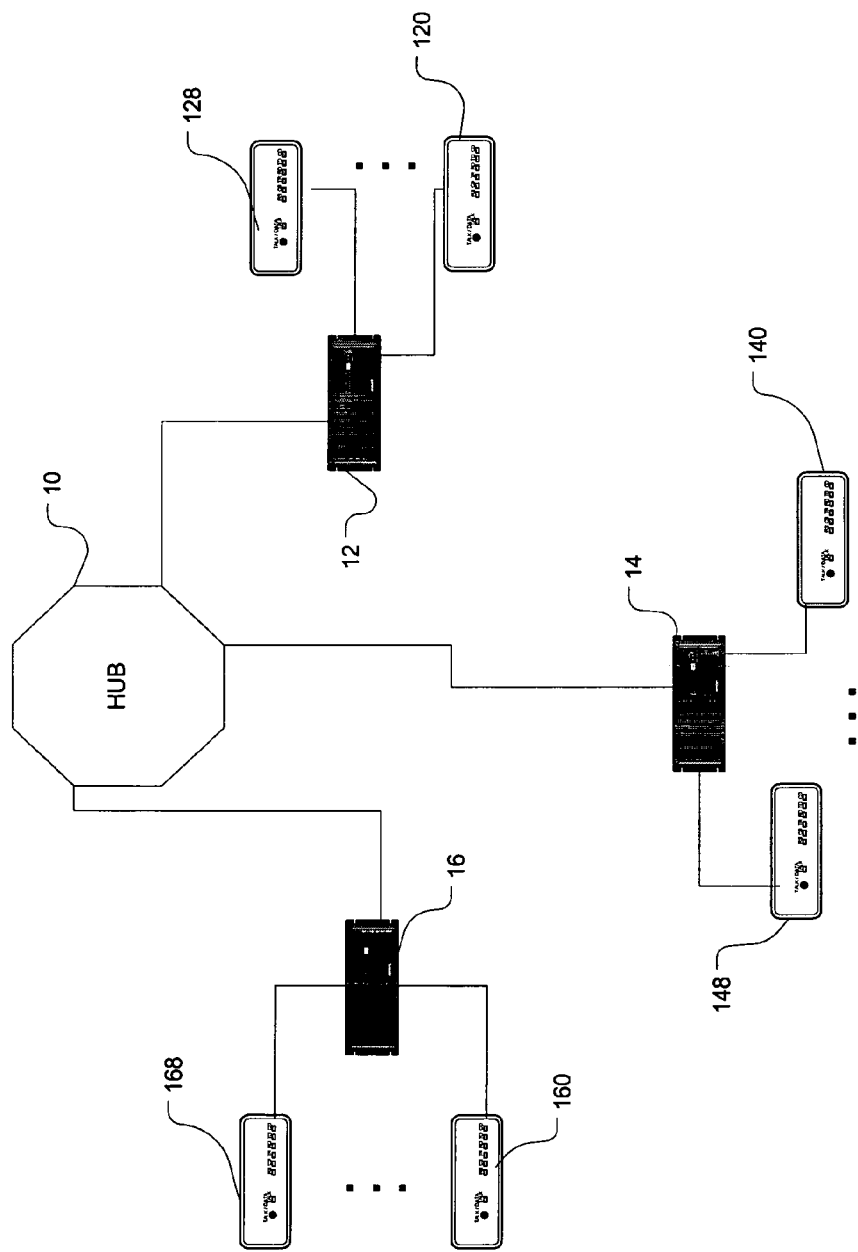
FIG. 1 shows an example of a cable network.

FIG. 1 shows an embodiment of a portion of a cable network. The hub 10 may have several extremely high-speed incoming connections, such as a satellite downlink, a gigabit Ethernet (GigE) connection, etc., from which the hub is provided with content for the cable subscribers. In addition, the GigE connection or other network connection provides connection to the other devices on the Internet. This allows users to employ their cable connections for data communications.

The hub 10 communicates with several cable modem termination systems (CMTS), such as 12, 14 and 16 that either reside at the hub or are in secondary hubs connected to the hub. Each CMTS may have multiple cable modems attached to it, such as 120-128 attached to CMTS 12, 140-148 attached to CMTS 14, and 160-168 attached to CMTS 16. A cable modem termination system may have thousands of individual cable modems connected to it. These devices communicate on channels within the cable connection.

The cable connection's bandwidth is divided into Upstream channels, typically within the range of 5 to 42 MHz, and Downstream channels, typically within the range of 54 to 860 MHz. The Upstream and Downstream channels are identified by discrete frequencies and channel widths within the available range. These channels are usually referred to as RF channels. After a cable modem establishes a connection with the CMTS it is assigned a service identifier (SID).

When a cable modem initially is powered up or reinitialized it generally begins the process of establishing connection with a CMTS. A CMTS such as 12 will generally transmit upstream information such as upstream channel designators at regular intervals on all of its downstream channels. Note that channels here refer to communications channels between the CMTS and the cable modem, not cable television channels. The cable modem will then being a process referred to as ranging, where the cable modem begins transmitting signals in 3 dB increments to attempt to synchronize between itself and the CMTS. The CMTS will typically assign a temporary SID to the cable modem, such as SID=1.

The cable modem may perform a finer level of ranging, such as at 0.25 dB increments to finely tune the connection. At this point, it may be said that the cable modem and the CMTS have established a link, but the cable modem is not generally considered to be 'online.' The cable modem will typically issue a bandwidth request, to which the CMTS responds with a bandwidth grant. The cable modem will then initiate an address assignment, such as a DHCP (dynamic host configuration protocol) discovery request.

It must be noted that the CMTS may not act as the DHCP server for the cable modem, as that may be a device on 'the other side' of the CMTS from the cable modem. In the specific embodiment of the address assignment process being DHCP, the CMTS will respond with an acknowledgement and the server addresses for a time of day (TOD) server and trivial file transfer protocol (TFTP) server.

The cable modem accesses the TOD server to synchronize its clock with the CMTS and the rest of the network, as will access the TFTP server to acquire a configuration file. The configuration file may contain information related to quality of service parameters, security, applicable frequency assignments, and new software images or upgrades.

The cable modem then transmits details of the configuration file to the CMTS via a registration request. If the CMTS deems the parameters within the registration request to be valid, the CMTS assigns a permanent SID to the cable modem, replies to the Cable Modem with a registration response and marks the cable modem as being online. This process may be repeated for each service flow or communication path between the cable modem and the CMTS.

Currently, two service flows are generally set for each cable modem, one in the upstream direction, from the cable modem to the CMTS, and one in the downstream direction, from the CMTS to the cable modem. It is possible that each cable modem will have more than two service flows, and in some cases may be desirable to allow management of a particular kind of data being transmitted and/or received in a particular service flow. It is also possible to manage the two typical service flows as well as other types of service flows for each cable modem so that the service flows are managed as part of a group.

In one current implementation, a service control engine (SCE) is introduced into the cable network. The SCE sits between the hub and the CMTSs and monitors traffic between the hub and the CMTSs. This approach has some disadvantages in that it adds a device to the network, as well as not providing control of traffic between the CMTSs and the cable modems.

The following discussion concerns a method of managing aggregate traffic for groups of cable modems and/or service flows to/from cable modems. The service flows may be referred to as being 'within' a cable modem, as they are part of the traffic from or to the cable modem to or from the CMTS. Further, the discussion may refer to the assignment as the cable modem being assigned. This will be used here to also refer to assigning service flows associated with a particular modem.

The CMTS may manage the service flows of a group based upon an assigned aggregate traffic rate for the group, also referred to as a group traffic rate. The group traffic rate may be assigned by the system designer at initialization, or altered by the administrator based upon network conditions. The assignment may be event based, changing as the network topology or services change.

Figure 2:
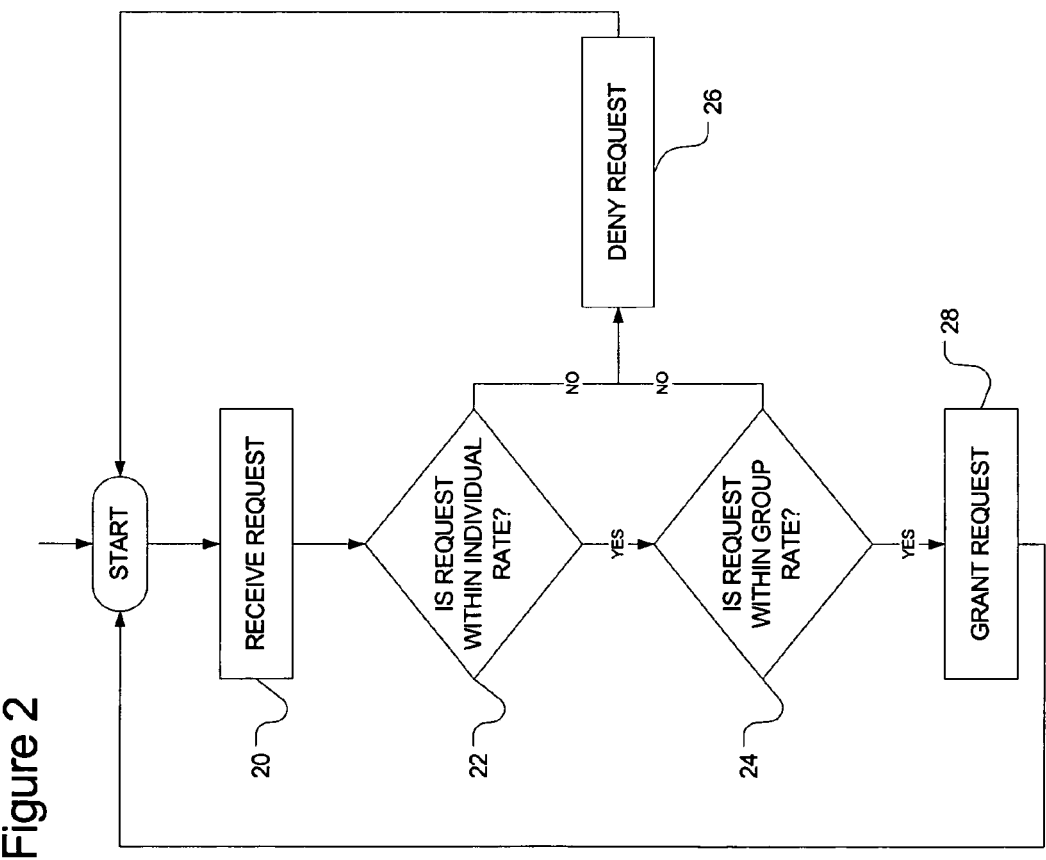
FIG. 2 shows a flowchart of an embodiment of a method of managing traffic.

FIG. 2 shows an embodiment of a method of managing traffic using group traffic flows. At 20, a request for bandwidth is received from a cable modem. The request may be associated with a particular service flow, such as the upstream and downstream service flows discussed earlier, as well as service flows based upon the type of traffic, such as BitTorrent™ data, or peer-to-peer traffic.

The service flows may also be grouped based upon the CMTS to which they are assigned, or on a modem basis, as well as whether the traffic is upstream or downstream as discussed above. In addition, the traffic may be grouped by users or by a 'user entity' such as the network service provider associated with the user, or with a company or other business entity with which the user is associated.

For example, a service provider may offer some sort of premium service, such as a 'gold' class for users. The service provider may regulate peer-to-peer traffic amongst regular or standard service users at a group rate of 2 megabits per second (Mbps) on a particular downstream, and 5 Mbps for 'gold' users. The provider may create service flows having a classifier that matches peer-to-peer traffic for both classes in the cable modems. Configuration files may even be categorized between the premium and standard users' cable modems, such that the different users' modems receive different configuration files.

Using the embodiment of a user entity, such as a network service provider or company, one group of cable modem users on a CMTS may belong to service provider or business A and another group to service provider or business group B. All of the users from group A may be limited to a group traffic rate and all the users from group B to another group traffic rate.

In another embodiment, the service flows are grouped in whatever manner desired, such as by traffic type, user entity, user, etc. A 'parent' or aggregate service flow is then created to which all of the 'child' or individual service flows point or refer. When a particular service flow issues a request, the CMTS discovers the aggregate service flow associated with the individual service flow and determines the limitations on the traffic rate.

Returning to FIG. 2, after the request is received at 20, the CMTS determines if the request is within the rate for that individual at 22. If the request is not within the individual rate at 22, the request is denied at 26 and the process returns to START to process the next request.

If the request is within the individual rate at 22, then the process moves to 24. At 24, the CMTS determines whether the request is within the group rate. This process may involve determining from which group the request came. The group rate may for that service flow, that CMTS, or that cable modem, as discussed above. If the request is within group rate, the request is granted at 28 and the process returns to START to process the next request. If the request would cause the group rate to be exceeded, the request is denied at 26 and the process returns to START to process the next request. The particular results of grant or denial will be referred to here as resolving the request.

In this manner, the system has a means to regulate traffic on a per group basis without having to implement a new network device or institute complicated resource allocation processes. The identification of the group or groups that affect a particular cable modem can be added to the configuration file for that particular cable modem. Multiple groups may be instituted for each cable modem.

The current DOCSIS specification has a mechanism referred to as a TLV (type length value) in which parameters may be provided to a cable modem. A vendor specific TLV is one only recognized by a particular vendor's CMTS. When the cable modem initializes and send the Registration Request based on the configuration file from itself to the CMTS, the CMTS of that vendor would recognize the TLV and institute the group traffic rates for however many groups designated in the configuration file.

It is possible that future versions of DOCSIS may include a DOCSIS standard TLV or other parameter in which the grouping(s) are specified for a cable modem.

Figure 3:
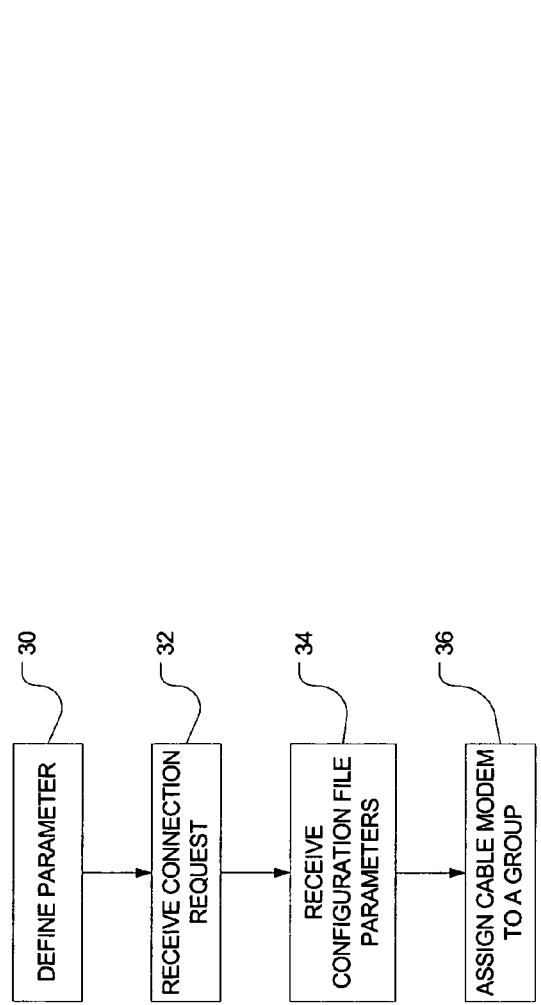
FIG. 3 shows a flowchart of an embodiment of a method to assign a cable modem to a group.

An embodiment of a process for initializing a cable modem and assigning it to particular groups is shown in FIG. 3. The group parameter for a particular cable modem is defined at 30. The group parameter may be for a group of cable modems, such as the 'gold' and standard cable modems discussed above, where there are two configuration files available depending upon the service class. This parameter is then defined in the configuration file in a particular situation or environment.

When the cable modem performs its connection request at 32 and retrieves the configuration file from the TFTP server, the CMTS receives the Registration Request containing the parameters defined within the configuration file from the cable modem at 34. The validity of the parameters received determines whether the connection request is granted, and the configuration file allows the CMTS to assign the cable modem to the specified groups at 36.

Figure 4:
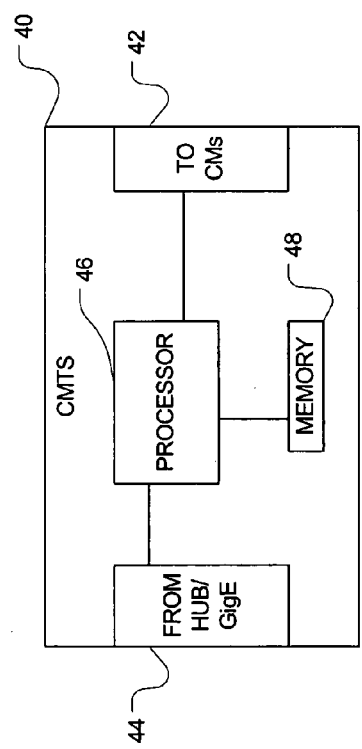
FIG. 4 shows an embodiment of a network device to perform per-group aggregate limitation.

This allows current CMTSs to recognize and perform groupings of service flows, cable modems, etc. without any additional hardware being introduced into the network. Existing CMTSs may be upgraded to include this capability, resulting in a 'new' CMTS such as that shown in FIG. 4.

The CMTS 40 has a port 42 that allows it to communicate with however many cable modems attached to it. A second port or interface 44 allows the CMTS to communicate with the hub, if the CMTS resides away from the hub, or the GigE inputs. Processor 46 assigns any cable modems in communication with the CMTS to a group based upon the received configuration files. The processor also monitors traffic of the cable modem so as to control a traffic rate of the group, generally by granting or denying requests from the cable modem. The CMTS may also contain a memory 48 to allow states of the various cable modems to be stored, among other things.

Further, the embodiments discussed above may be implemented by upgrading or altering software executed by the processor and other components of the device. In this situation, an article of non-transitory computer-readable media may contain code that, when executed, causes the CMTS to implement the methods discussed above. Note that with regard to the 'computer-readable' media, the processor within the CMTS would be the computer.

Further adaptations and modifications may be made within the scope of the embodiments of this invention. For example, in 'wideband' DOCSIS, in either an upstream or downstream direction, the combinations of Quadrature Amplitude Modulators (QAM) channels and service flows could each be assigned a DOCSIS service flow.

'Wideband' DOCSIS is a protocol developed by Cisco Systems, Inc. in which several 'standard' or 'narrowband' channels defined by the DOCSIS specifications are used to transmit the data. A wideband channel is a collection of narrowband channels 'bonded' together, and may be referred to as 'channel bonding.' Data for a wideband channel is placed 'vertically' across several DOCSIS standard or narrowband channels. This is in contrast to a narrowband channel that places data across one channel horizontally in time. Cisco Systems has several patent applications pending on topics related to wideband DOCSIS channels.

In this instance, the service flow would be a child service flow of an aggregate parent service flow as discussed above. The child service flows would be assigned rates on a per QAM basis, and the parent service flow receives a rate that applies to all of the child service flows. This results in a two-tier hierarchical service flow system.

In wideband DOCSIS, cable modems may place a bonded flow of packets across multiple upstream channels. The CMTS would use the two-tier hierarchical system to place a bound on the operation of the cable modem. For example, each upstream may be assigned a service flow and limited to 1 Mbps. An overall bonding channel of four upstreams would be formed, but the aggregate limit would be 2 Mbps, instead of 4 Mbps.

In yet another embodiment, there may be multiple sessions within a service class. For example, multiple virtual private network (VPN) tunnels may each have their own service flows. There would be a VPN service flow to aggregate the individual tunnels into a limited traffic service flow.

In other embodiments, there need not be a limitation to a cable network. It is possible that other types of network access devices, such as LAN ports, modems and other points-of-presence (POPs) may utilize similar methods to control traffic rates. For example, the cable modems could be user devices and the CMTS would be a network access server. The aggregate traffic rate of groups of the user devices would be controlled by the network access service.

Thus, although there has been described to this point a particular embodiment for a method and apparatus for one-way wireless binding between devices, it is not intended that such specific references be considered as limitations upon the scope of this invention except in-so-far as set forth in the following claims.

What is claimed is:

1. A network device, comprising:
a port to allow the device to communicate with user devices;
a processor to:
assign a user device in communication with the device to at least one group;
receive a connection request from the user device associated with a group of the at least one group;
determine if a traffic rate associated with the connection request is within an individual traffic rate associated with the user device;
if the traffic rate associated with the connection request is not within the individual traffic rate associated with the user device, transmit a response to the user device denying the connection request;
if the traffic rate associated with the connection request is within the individual traffic rate associated with the user device, determine if an addition of the traffic rate to an aggregate of traffic rates associated with other user devices of the group would exceed a group traffic rate of the group associated with the connection request;
if the addition would not exceed the group traffic rate, transmit a response to the user device granting the connection request; and
if the addition would exceed the group traffic rate, transmit a response to the user device denying the connection request;
wherein to receive the connection request from the user device further comprises
to receive a request from a cable modem;
wherein to assign the user device to the at least one group further comprises to assign the user device to the at least one group by:
defining a parameter in a configuration file for the modem;
receiving a connection request from the modem;
receiving the configuration file from the modem, wherein the configuration file contains the parameter; and
using the parameter to assign the cable modem to a group.

2. The network device of claim 1, wherein the network device is a cable modem termination server and the user device is a cable modem.

3. The network device of claim 1, wherein the network device is a network access server and the user device further comprises at least one selected from the group consisting of: a modem or a LAN port.

4. The network device of claim 1, the device further comprising a second port to allow the device to communicate with a data network.

5. The network device of claim 1, the processor to assign the user device to a group based upon one selected from the group consisting of: type of traffic, upstream traffic, downstream traffic, user class and user entity.

6. The network device of claim 2, the processor to assign user devices to a group further comprising assigning service flows within the cable modem termination system to an aggregate service flow.

7. The network device of claim 1, wherein a sum of the individual traffic rates associated with user devices of the group is greater than the group traffic rate of the group.

8. A method of managing traffic with a network device, comprising:
- receiving a connection request from a user device through a port coupled to the user device;
- identifying a group to which the user device belongs associated with the connection request;
- determining if a traffic rate associated with the connection request is within an individual traffic rate associated with the user device;
- if the traffic rate associated with the connection request is not within the individual traffic rate associated with the user device, transmitting a response to the user device denying the connection request;
- if the traffic rate associated with the connection request is within the individual traffic rate associated with the user device, determining if an addition of the traffic rate to an aggregate of traffic rates associated with other user devices of the group would exceed a group traffic rate of the group associated with the connection request;
- if the addition would not exceed the group traffic rate, transmitting a response to the user device granting the connection request; and
- if the addition would exceed the group traffic rate, transmitting a response to the user device denying the connection request;
- wherein receiving the connection request from the user device further comprises receiving a request from a cable modem;
- assigning a user device to a group by:
- defining a parameter in a configuration file for the modem;
- receiving a connection request from the modem;
- receiving the configuration file from the modem, wherein the configuration file contains the parameter; and
- using the parameter to assign the cable modem to a group.

9. The method of claim 8, wherein the parameter further comprises a standardized type length value under a DOCSIS specification.

10. The method of claim 8, wherein the parameter further comprises a vendor-specific type length value.

11. The method of claim 8, wherein the parameter defines the group based upon one of the group consisting of: traffic type, upstream traffic, downstream traffic, user class and user entity.

12. The method of claim 8, wherein identifying the group further comprises identifying a group based upon a service flow to which the request belongs.

13. The method of claim 8, wherein identifying the group further comprises identifying an aggregate service flow to which a service flow associated with the request belongs.

14. The method of claim 8, wherein:
- receiving the request further comprises receiving an upstream request to allow a user device to transmit data over a connection associated with the connection request;
- transmitting the response to the user device denying the connection request if the traffic rate associated with the connection request is not within the individual traffic rate associated with the user device occurs before the user transmits the data over the connection;
- transmitting the response to the user device granting the connection request if the addition would not exceed the group traffic rate occurs before the user transmits the data over the connection; and
- transmitting the response to the user device denying the connection request if the addition would exceed the group traffic rate occurs before the user transmits the data over the connection.

15. The method of claim 8, wherein receiving the request further comprises receiving a downstream request to allow the user device to receive data over a connection associated with the connection request; and
- transmitting the response to the user device denying the connection request if the traffic rate associated with the connection request is not within the individual traffic rate associated with the user device occurs before the user receives the data over the connection.

16. A network device, comprising:
- a means for allowing the device to communicate with user devices;
- a means for assigning a user device in communication with the device to at least one group;
- a means for receiving a connection request from the user device associated with a group of the at least one group;
- a means for determining if a traffic rate associated with the connection request is within an individual traffic rate associated with the user device;
- a means for transmitting a response to the user device denying the connection request if the traffic rate associated with the connection request is not within the individual traffic rate associated with the user device;
- a means for determining if an addition of the traffic rate to an aggregate of traffic rates associated with other user devices of the group would exceed a group traffic rate of the group associated with the connection request if the traffic rate associated with the connection request is within the individual traffic rate associated with the user device;
- a means for transmitting a response to the user device granting the connection request if the addition would not exceed the group traffic rate; and
- a means for transmitting a response to the user device denying the connection request if the addition would exceed the group traffic rate;
- wherein the means for receiving the connection request from the user device further comprises receiving a request from a cable modem;
- wherein the means for assigning the user device in communication with the device to at least one group assigns the user device by:
- defining a parameter in a configuration file for the modem;
- receiving a connection request from the modem;
- receiving the configuration file from the modem, wherein the configuration file contains the parameter; and
- using the parameter to assign the cable modem to a group.

17. The network device of claim 16, the device further comprising means for allowing the device to communicate with a data network.

18. A non-transitory computer-readable media containing software code that, when executed on a computer, causes the computer to:
- receive a connection request from a user device;
- identify a group to which the user device belongs associated with the connection request;
- determine if a traffic rate associated with the connection request is within an individual traffic rate associated with the user device;
- if the traffic rate associated with the connection request is not within the individual traffic rate associated with the user device, transmit a response to the user device denying the connection request;

if the traffic rate associated with the connection request is within the individual traffic rate associated with the user device, determine if an addition of the traffic rate to an aggregate of traffic rates associated with other user devices of the group would exceed a group traffic rate of the group associated with the connection request;

if the addition would not exceed the group traffic rate, transmit a response to the user device granting the connection request; and if the addition would exceed the group traffic rate, transmit a response to the user device denying the connection request;

wherein the code causing the computer to receive the connection request from the user device further causes the computer to receive a request from a cable modem;

wherein the software code, when executed, further causes the computer to assign a cable modem to a group by:

defining a parameter in a configuration file for the modem;

receiving a connection request from the modem;

receiving the configuration file from the modem, wherein the configuration file contains the parameter; and using the parameter to assign the cable modem to a group.

\* \* \* \* \*